(12) United States Patent
Pernleitner et al.

(10) Patent No.: US 9,359,904 B2
(45) Date of Patent: Jun. 7, 2016

(54) BLADE FOR A TURBOMACHINE, BLADE ARRANGEMENT, AND TURBOMACHINE

(71) Applicant: MTU Aero Engines GmbH, Munich (DE)

(72) Inventors: Martin Pernleitner, Dachau (DE); Manfred Dopfer, Unterschleissheim (DE); Norbert Huebner, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 390 days.

(21) Appl. No.: 13/861,568

(22) Filed: Apr. 12, 2013

(65) Prior Publication Data

US 2013/0272884 A1 Oct. 17, 2013

(30) Foreign Application Priority Data

Apr. 13, 2012 (EP) .................................... 12164186

(51) Int. Cl.
| | |
|---|---|
| *F01D 5/30* | (2006.01) |
| *F01D 11/00* | (2006.01) |
| *B63H 1/16* | (2006.01) |
| *B63H 1/26* | (2006.01) |
| *B64C 11/16* | (2006.01) |
| *F01D 5/22* | (2006.01) |
| *F01D 5/14* | (2006.01) |

(52) U.S. Cl.
CPC ................. *F01D 5/225* (2013.01); *F01D 5/143* (2013.01); *F01D 5/145* (2013.01); *Y02T 50/673* (2013.01)

(58) Field of Classification Search
CPC ......... F01D 5/225; F01D 5/145; F01D 5/143; Y02T 50/673

USPC ........... 416/193 A, 193 R, 223 A, 223 R, 243
IPC .................................................. F01D 5/14,9/02
See application file for complete search history.

(56) References Cited

U.S. PATENT DOCUMENTS

| | | | | |
|---|---|---|---|---|
| 5,525,038 | A * | 6/1996 | Sharma et al. | ............ 416/223 A |
| 6,669,445 | B2 | 12/2003 | Staubach et al. | |
| 7,134,842 | B2 * | 11/2006 | Tam et al. | .................. 416/193 A |
| 7,195,454 | B2 | 3/2007 | Lu et al. | ......................... 415/181 |
| 7,217,096 | B2 * | 5/2007 | Lee | ............................ 416/223 A |
| 7,249,933 | B2 * | 7/2007 | Lee et al. | .................... 416/193 A |
| 8,206,115 | B2 * | 6/2012 | Gupta et al. | .............. 416/193 A |
| 8,459,956 | B2 * | 6/2013 | Pandey et al. | .................. 416/243 |

(Continued)

FOREIGN PATENT DOCUMENTS

| | | | | | |
|---|---|---|---|---|---|
| EP | | 2136033 | A1 * | 12/2009 | ................ F01D 5/14 |
| EP | | 2581555 | A1 * | 4/2013 | ................ F01D 5/14 |

(Continued)

*Primary Examiner* — Thai Ba Trieu
(74) *Attorney, Agent, or Firm* — Davidson, Davidson & Kappel, LLC

(57) ABSTRACT

A blade for a turbomachine, in particular a jet engine, including a shroud, having two opposite lateral edges, for delimiting a main flow channel and including a blade which extends away from the shroud, a rounded transition area being provided which encompasses the blade on its root side and is guided beyond the one lateral edge, a section of the transition area protruding beyond the one lateral edge being severed and situated in the area of the other lateral edge as an elevation offset in the transverse direction, a blade arrangement having at least two of such blades as well as a turbomachine having a plurality of such blades.

10 Claims, 2 Drawing Sheets

(56) References Cited

U.S. PATENT DOCUMENTS

| | | | |
|---|---|---|---|
| 2009/0053066 A1* | 2/2009 | Iida | 416/223 R |
| 2010/0158696 A1* | 6/2010 | Pandey et al. | 416/243 |
| 2011/0044818 A1* | 2/2011 | Kuhne et al. | 416/223 A |
| 2013/0224027 A1* | 8/2013 | Barr et al. | 416/193 A |
| 2014/0286773 A1* | 9/2014 | Okita | 416/95 |
| 2014/0348661 A1* | 11/2014 | Mahle et al. | 416/243 |
| 2015/0107265 A1* | 4/2015 | Smith et al. | 416/193 R |

FOREIGN PATENT DOCUMENTS

| | | | | |
|---|---|---|---|---|
| EP | 2806103 A1 * | 11/2014 | | F01D 5/14 |
| WO | WO 2010/068391 A2 | 1/2010 | | |
| WO | WO 2011/022111 A2 | 2/2011 | | |
| WO | WO 2012157498 A1 * | 11/2012 | | F01D 9/02 |

* cited by examiner

BLADE FOR A TURBOMACHINE, BLADE ARRANGEMENT, AND TURBOMACHINE

This claims the benefit of European Patent Application EP 12164186.4-2321, filed Apr. 13, 2012 and hereby incorporated by reference herein.

The present invention relates to a blade for a turbomachine, in particular a jet engine, a blade arrangement for a turbomachine, and a turbomachine.

BACKGROUND

Turbomachines such as jet engines regularly have moving blades having an inner shroud for delimiting an annular space or a main flow channel through which a main flow flows. The inner shroud is situated between a blade shaft and a blade and conventionally has no contours. The blade extends away from the inner shroud and always has a rounded transition area to the inner shroud. The shrouds of the moving and stationary blades may also be provided with contours in the form of elevations and recesses for flow influencing purposes. As shown in patent applications WO 2010/068391 A2, U.S. Pat. No. 6,669,445 and WO 2011/022111 A2, for example, the contours may extend to the shroud of the particular adjacent blade.

SUMMARY OF THE INVENTION

In general, it is strived for reducing the number of blades, in particular in fast-running rotors. For this purpose, every blade must, however, perform more aerodynamic work, whereby the blades are subjected to greater aerodynamic and structural-mechanical stresses. To prevent the blades from breaking or being damaged, they are therefore to be stabilized separately, which generally results in a massive construction in the hub area. From the structural-mechanical point of view, a clearance angle should, however, be small and a difference between an inner shroud angle and the clearance angle should be as small as possible. From the aerodynamic point of view, break-away edges or steps are to be avoided in the area of the shroud lateral edges.

It is an object of the present invention to provide a blade for a turbomachine, in particular a jet engine, which eliminates the above-mentioned disadvantages and is easy to manufacture. Furthermore, it is the object of the present invention to provide a blade arrangement for a turbomachine having heavy-duty blades, as well as a turbomachine having a high efficiency.

This object is achieved by a blade, by a blade arrangement, and by a turbomachine.

The present invention provides a blade for a turbomachine, in particular a jet engine that has a shroud having two opposite lateral edges for delimiting a main flow channel and a blade which extends away from the shroud. According to the present invention, the blade has a transition area for stabilizing the blade which encompasses the blade on its root side and is guided at least beyond the one lateral edge, a section of the transition area protruding beyond the one lateral edge being severed and situated in the area of the other lateral edge as an elevation offset in the transverse direction.

The blade according to the present invention enables the formation of blade arrangements having transition areas extending over partition lines between the adjacent blades, without break-away edges or steps being formed on the lateral edges of the shrouds. By guiding the transition area to at least one adjacent shroud, it may be widened and thus a higher stabilization, from the structural-mechanical point of view, of the particular blade may be achieved. Therefore, larger blades are generally possible in the case of the unchanged shroud size and root profiles. Every blade may thus perform more aerodynamic work, whereby the overall number of blades per blade row may be reduced. Here, a stall may be avoided by avoiding break-away edges or steps in the area of the lateral edges. In addition, a small clearance angle is created and an advantageous clearance angle/shroud angle ratio is set. The shrouds may be inner shrouds or outer shrouds, and the blades may be moving blades, stationary blades, or blade segments.

To be able to optimally profile the blade from the aerodynamic point of view, the transition area may be guided beyond the lateral edge on both the pressure and the suction side and the shroud may have at least one pressure-side elevation as well as at least one suction-side elevation. In this way, the blade may be guided directly to the lateral edges, and the width of the shroud may thus be fully exploited. Minimum distances between the lateral edges and the blade do not exist, so to speak, due to the transition areas being guided [to lateral edges] according to the present invention.

To minimize the influence of the transition area on the flow between the adjacent blades, the transition area may transition tangentially into the shroud. In this way, the transition area peters out steplessly which is additionally advantageous from the structural-mechanical point of view. In addition, a tangential transition facilitates the manufacture of the blade as a casting part.

The transition area preferably has a constant height on the blade root side. In this way, the blade transitions on the pressure and the suction sides into its wing-like profile at the same height, whereby a wake flow is achieved which is constant or almost constant in comparison to a conventional blade.

The transition area on the blade preferably has a maximum height, which is reduced in the direction of the shroud. In this way, an advantageous introduction of force into the shroud may be implemented. Here, it is also advantageous when a transition radius does not change its orientation and the transition area is thus rounded.

The transition area preferably has an approximately constant width, whereby the flow in the area of the transition area is made uniform.

One preferred blade arrangement for a turbomachine, in particular a jet engine, has at least two blades according to the present invention, the blades being arranged side-by-side, and one blade having a shroud-side elevation forming at least one severed section of a transition area of the other blade.

In this way, the transition areas extend at least sectionally to the particular adjacent shroud and peter out on same. In other words, the radiuses of the transition areas are guided over a partition line between the adjacent blades, whereby on the one hand, the transition areas may be widened, thus resulting in a high stabilization of the blades. On the other hand, steps or break-away edges are prevented in the area of the partition lines. In addition, a small clearance angle is created and an advantageous clearance angle/shroud angle ratio is set.

One preferred turbomachine has a blade arrangement according to the present invention or a plurality of blades according to the present invention for forming at least one blade row. Such a turbomachine distinguishes itself by a high efficiency, since the blade number per blade row may be reduced due to the high aerodynamic and structural-mechanical strength of every single blade.

Other advantageous exemplary embodiments of the present invention are the subject matter of further subclaims.

BRIEF DESCRIPTION OF THE DRAWINGS

In the following, one preferred exemplary embodiment of the present invention is elucidated in greater detail with reference to the highly simplified schematic illustrations.

DETAILED DESCRIPTION

Figure 1:
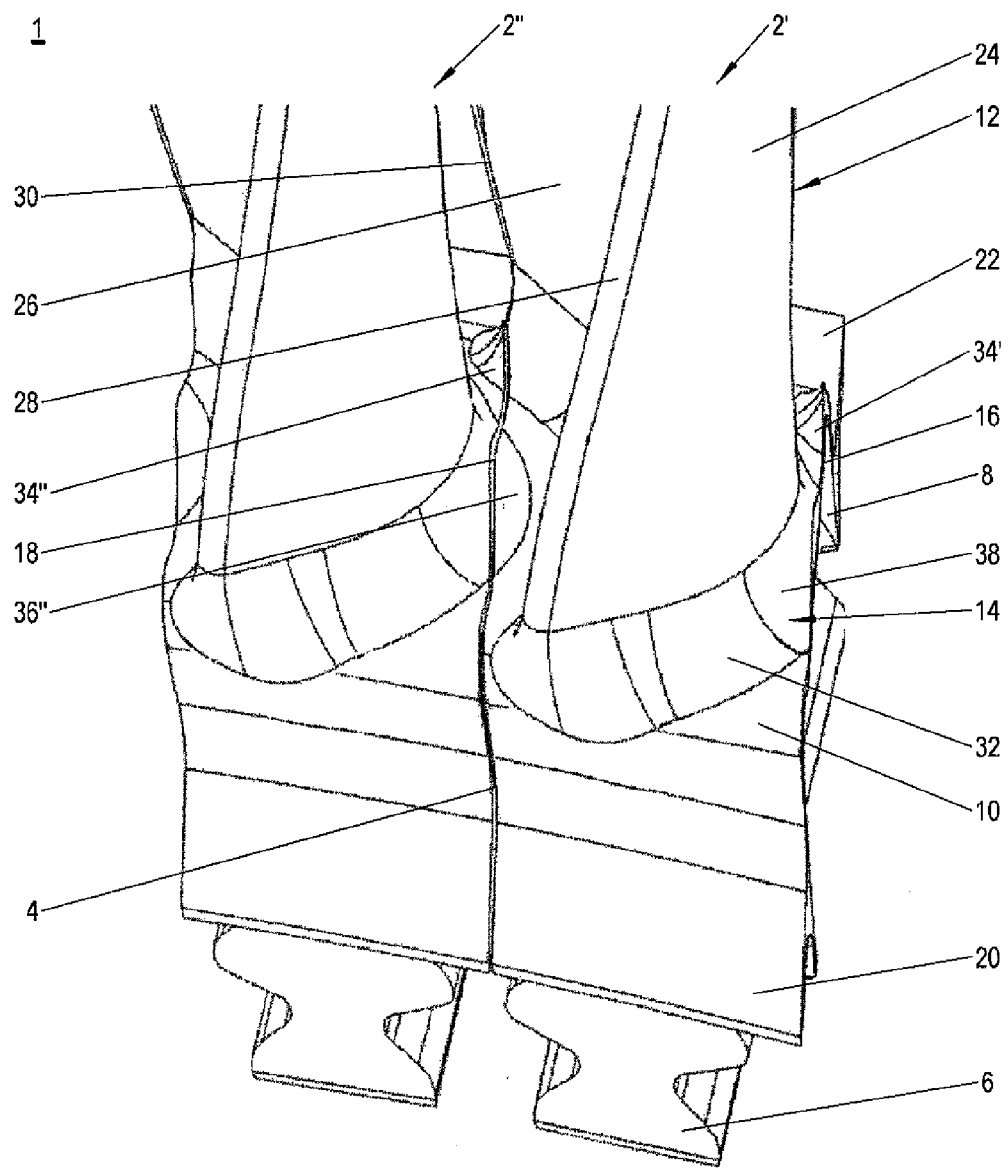
FIG. 1 shows a representation of two adjacent moving blades of a moving blade row in the flow direction.

FIG. 1 shows a section of a moving blade row 1 of a turbomachine in the flow direction of a main flow. The turbomachine is, for example, a jet engine, and moving blade row 1 is situated on the turbine side. Moving blade row 1 has a plurality of moving blades 2', 2" which are arranged next to one another side-by-side or in the peripheral direction and which are each separated from one another via a partition line 4 which is closed during operation. Moving blades 2', 2" (2) are, for example, precision-casting parts and each have a root 6 to be arranged on a rotor disc, a neck or shaft 8, an inner shroud 10, a blade 12, as well as a transition area 14.

Root 6 is implemented as a so-called fir-tree blade root. Other types of roots, e.g., dove-tail, T-head etc., are also possible in this case. The fir-tree blade root has a plurality of axial protrusions and is slid into appropriate axial grooves of a rotor disc. Neck 8 is a connecting element between root 6 and blade 12 and is delimited radially externally by inner shroud 10.

Inner shroud 10 delimits an annular space through which a main flow flows. It extends in the axial direction and has two opposing lateral edges 16, 18, one of which is situated on the suction side and the other on the pressure side. In addition, inner shroud 10 has an upstream or front protrusion 20 which is offset radially inward or in the direction of root 6 as well as a downstream or rear protrusion 22.

Blade 12 extends away from inner shroud 10 or radially outward and is thus situated in the annular space in the assembled state. It has a wing-like profile having a suction side 24, an opposite pressure side 26, a front leading edge 28, and a rear trailing edge 30. In addition, blade 12 has a blade root (no reference numeral provided) and an opposite blade tip (not shown in the drawing).

Transition area 14 is used to stabilize blade 12. It fully encompasses blade 12 on its root. It is implemented as a root collar of blade 12, so to say, whose front side (bottom area) is connected to inner shroud 10 over a wide area. The transition area preferably extends tangentially from blade 12 and transitions tangentially into inner shroud 10. In particular, it has a concave outer peripheral area 32. Transition area 14 is thus rounded or provided with radiuses having constant orientations. It has a constant maximum height at blade 12 and continuously peters out in the direction of inner shroud 10. Transition area 14 preferably has a constant width.

Figure 2:
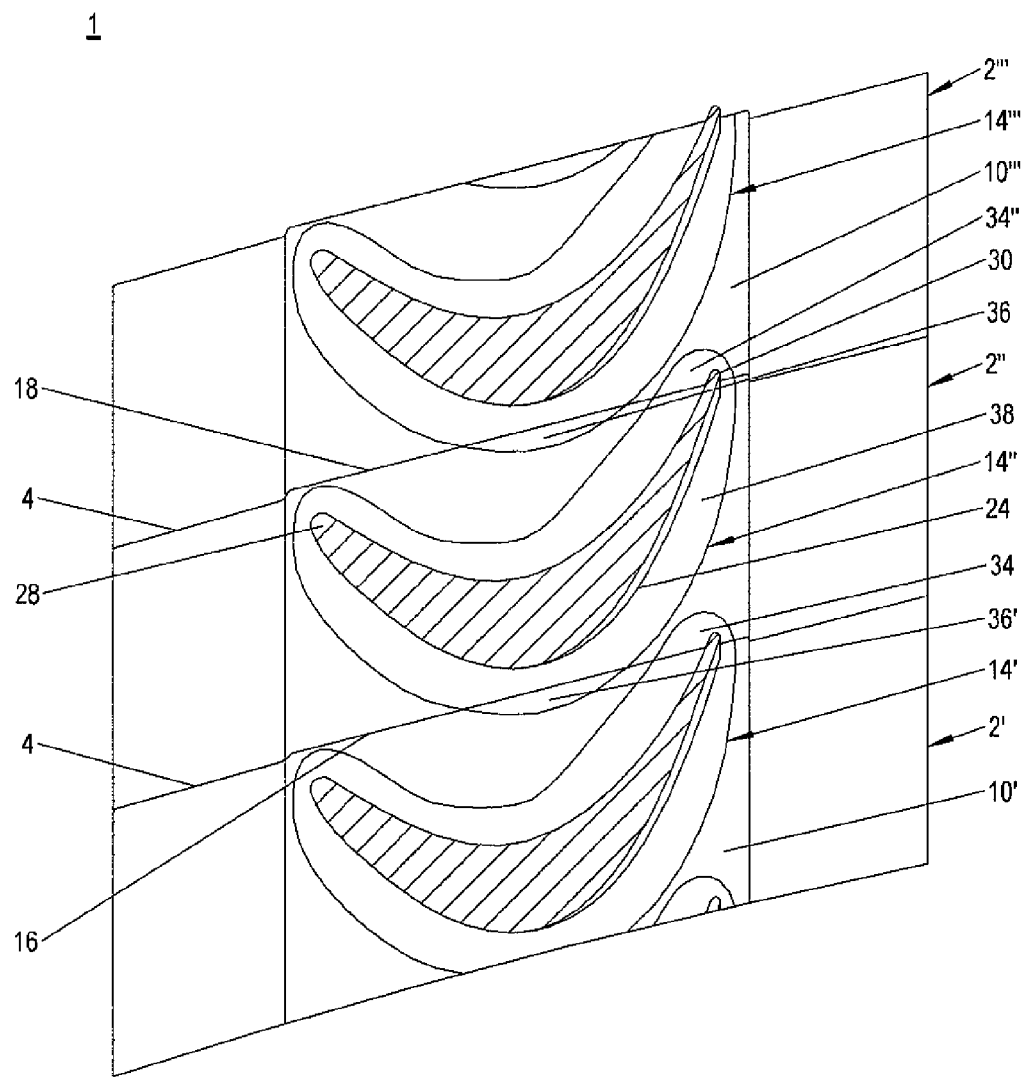
FIG. 2 shows a top view in a partial section of three adjacent moving blades of the moving blade row.

As shown in the figures and in particular provided with a reference numeral in FIG. 2, transition area 14" of the one blade 2" extends to inner shrouds 10', 10''' of adjacent blades 2', 2'''. Transition area 14" is guided at least sectionally over partition lines 4 to adjacent inner shrouds 10', 10''' and peters out on same. In this way, transition areas 14', 14''' [sic; 14"], 14''' (14) may be widened, without break-away edges or steps forming on lateral edges 16, 18 or at partition lines 4. In this exemplary embodiment, inner shrouds 10 between transition areas 14 do not have contours or variations. Naturally, however, contours in the form of elevations and recesses may be formed between transition areas 14 which also extend over multiple inner shrouds 10 or are continued beyond partition lines 4.

In the exemplary embodiment shown, transition area 14" has two sections which are severed, so to say, and which are situated on adjacent inner shrouds 10', 10'''. In the area of trailing edge 30, on the one hand, transition area 14" is guided to inner shroud 10''' of adjacent pressure-side moving blade 2'''. In the area of suction side 24, on the other hand, transition area 14" is guided approximately centrally between leading edge 28 and trailing edge 30 to inner shroud 10' of adjacent suction-side blade 2'. To implement this extension of transition areas 14 (14', 14", 14''') reaching over partition lines 4, an elevation 34, which corresponds, with regard to its shape, to the section of transition area 14" severed in the area of trailing edge 30 and which is offset in relation to inner shroud 10" in the area of suction-side lateral edge 16 in the transverse direction of same, is implemented on suction-side lateral edge 16 in this exemplary embodiment. On pressure-side lateral edge 18, an elevation 36 is also formed, which corresponds, with regard to its shape, to the section of transition area 14" severed in the area of suction side 24 and which is offset in the transverse direction in the area of pressure-side lateral edge 18 in relation to transition area 14". Severed sections 34, 36 are thus each offset, viewed in the transverse direction of inner shrouds 10 or in the peripheral direction of moving blade row 1, and are situated in the area of opposite lateral edges 16, 18, each of these sections forming a part of lateral edges 16, 18. In this exemplary embodiment, transition area 14" closed in the assembled state is thus formed by a core section 38, situated on inner shroud 10" of blade 2", of elevation 34", situated on inner shroud 10''' of blade 2''', and of elevation 36' situated on inner shroud 10' of blade 2'. Therefore, the following systematic results for moving blade row 1 are shown here as an example: transition area 14 (n)=core section 38 (n)+elevation 34 (n+1)+elevation 36 (n−1), n being the blade number.

Even if the present invention is explained in the figures with reference to moving blades 2', 2", 2''' (2) and, in particular, with reference to their inner shrouds 10, the present invention may naturally also be provided on outer shrouds of moving blades 2 as well as on inner and outer shrouds of stationary blades or on blade segments.

Disclosed is a blade for a turbomachine, in particular a jet engine, including a shroud, having two opposite lateral edges, for delimiting a main flow channel and including a blade which extends away from the shroud, a rounded transition area being provided which encompasses the blade on its root side and is guided beyond the one lateral edge, a section of the transition area protruding beyond the one lateral edge being severed and situated in the area of the other lateral edge as an elevation offset in the transverse direction, a blade arrangement having at least two of such blades as well as a turbomachine having a plurality of such blades.

LIST OF REFERENCE NUMERALS 1 moving blade row
2, 2', 2" moving blade
4 partition line
6 root
8 neck
10, 10', 10", 10''' inner shroud
12 blade
14, 14', 14", 14''' transition area
16 lateral edge
18 lateral edge 20 front protrusion
22 rear protrusion
24 suction side
26 pressure side
28 leading edge
30 trailing edge
32 outer peripheral area
34, 34''' elevation
36, 36' elevation
38 core section

What is claimed is:

1. A blade for a turbomachine comprising:
 a shroud having a first lateral edge and a second opposite lateral edge for delimiting a main flow channel; and
 a blade extending away from the shroud,
  wherein the blade includes at least two divided transition areas,
  wherein a first part of a first of the at least two divided transition areas encompasses the blade on a root side and extends to one of the lateral edges, and
  wherein a second of the at least two divided transition areas is allocated to an adjacent blade;
  wherein a second part of the second of the at least two divided transition areas is arranged as an elevation, which is displaced in a transverse direction of the shroud, in an area of the other lateral edge on the shroud,
  wherein a shape of the elevation corresponds to a second part of the first of the at least two divided transition areas which is provided on an adjacent blade, wherein the first part of the first of the at least two divided transition areas completely encompasses the blade on the root side and is arranged on a surface of the shroud.

2. The blade as recited in claim 1 wherein each of said at least two divided transition areas would be guided beyond the lateral edges on both a pressure and a suction side and the shroud thus defines at least one suction-side elevation as well as at least one pressure-side elevation.

3. The blade as recited in claim 1 wherein each of said at least two divided transition areas transitions tangentially into the shroud.

4. The blade as recited in claim 1 wherein each of said at least two divided transition areas has a constant height on the blade-root side.

5. The blade as recited in claim 1 wherein each of said at least two divided transition areas on the blade has a maximum height, which is continuously reduced in the direction of the shroud.

6. The blade as recited in claim 1 wherein each of said at least two divided transition areas has a substantially constant width.

7. The blade as recited in claim 1 wherein the blade is a jet engine blade.

8. A blade arrangement for a turbomachine, comprising:
 at least two blades as recited in claim 1 wherein, the blades are arranged side-by-side, and one of the blades having an elevation completing a severed section of a transition area of the other blade.

9. A turbomachine comprising a blade arrangement as recited in claim 8.

10. A jet engine comprising the turbomachine of claim 9.

* * * * *